United States Patent [19]

Dorner et al.

[11] Patent Number: 5,156,260
[45] Date of Patent: Oct. 20, 1992

[54] CONVEYOR CONSTRUCTION HAVING SIDE RAILS WITH DOUBLE LONGITUDINAL SLOTS

[75] Inventors: Wolfgang C. Dorner, Oconomowoc; Kenneth N. Hansen, Waukesha; Michael A. Hosch; Terrence E. O'Brien, both of Oconomowoc, all of Wis.

[73] Assignee: Dorner Mfg. Corp., Hartland, Wis.

[21] Appl. No.: 731,526

[22] Filed: Jul. 17, 1991

[51] Int. Cl.5 .................................. B65G 23/44
[52] U.S. Cl. .................. 198/813; 198/836.1; 198/841; 198/835; 198/840
[58] Field of Search ............ 198/813, 814, 816, 860.2, 198/860.3, 860.5, 861.1, 836.1, 836.3, 841, 836.4, 834, 835, 806, 840

[56] References Cited

U.S. PATENT DOCUMENTS

| | | | |
|---|---|---|---|
| 3,292,772 | 12/1966 | Rice | 198/813 |
| 3,605,994 | 9/1971 | Parlette | 198/861.1 |
| 3,669,244 | 6/1972 | Pagdin et al. | 198/836.3 X |
| 3,800,938 | 4/1974 | Stone | 198/841 |
| 3,825,108 | 7/1974 | Stone | 198/861.1 |
| 3,923,148 | 12/1975 | Dorner | |
| 4,037,876 | 7/1977 | Georg et al. | 198/813 X |
| 4,090,601 | 5/1978 | Freed, Jr. | 198/813 X |
| 4,501,353 | 2/1985 | Burkhardt | 198/860.3 X |
| 4,951,809 | 8/1990 | Boothe et al. | 198/861.1 X |
| 4,993,542 | 2/1991 | Nomura | 198/836.1 X |

FOREIGN PATENT DOCUMENTS

| | | | |
|---|---|---|---|
| 3537135 | 4/1987 | Fed. Rep. of Germany | 198/861.1 |
| 0167106 | 6/1989 | Japan | 198/861.1 |

Primary Examiner—D. Glenn Dayoan
Attorney, Agent, or Firm—Andrus, Sceales, Starke & Sawall

[57] ABSTRACT

A conveyor constructing having a pair of spaced parallel side rails that support a conveyor belt, each of the side rails is provided with a pair of vertically spaced, parallel, longitudinal slots. Each slot is generally T-shaped in cross section and has an open side facing laterally outward of the side rail. The open side of the lower slot is offset laterally outward from the open side of the upper slot of the side rail. End units are associated with each end of the conveyor and each end unit includes a pair of spaced side plates having a belt supporting spindle journalled between the side plates. Slide blocks are mounted in the ends of the slots in the side rail and the side plates are disposed outward of the respective side rails and are connected to the slide blocks. Slide blocks can also be mounted in the slots and serve to connect auxiliary equipment at selected positions to the conveyor.

31 Claims, 6 Drawing Sheets

CONVEYOR CONSTRUCTION HAVING SIDE RAILS WITH DOUBLE LONGITUDINAL SLOTS

BACKGROUND OF THE INVENTION

Normally a conveyor for conveying relatively small parts or articles, is mounted on a series of stands or supports and it is desirable to be able to locate the stands at various positions along the length of the conveyor. A further desirable feature for a conveyor is the ability to attach auxiliary components, such as sensors, guides, stops, and the like to the conveyor frame and to be able to locate the components at various positions on the conveyor.

It is also an advantage to be able to incorporate different drives with a conveyor. For example, in certain installations a direct drive without speed reduction may be desired, and depending upon space requirements, it may be necessary to locate the drive either outboard or beneath an end of the conveyor. In other situations, it may be desirable to locate the drive beneath the conveyor intermediate the ends of the conveyor. Therefore, the conveyor should be capable of accommodating various drive configurations without the necessity of altering or modifying the basic conveyor structure.

SUMMARY OF THE INVENTION

The invention is directed to an improved conveyor which includes a pair of parallel spaced side rails and a plurality of cross members extend transversely between the side rails. A conveyor belt is supported for endless travel on the side rails, cross members, and bed plate.

In accordance with the invention, each side rail is provided with a pair of vertically spaced parallel longitudinal slots. Each slot has a generally T-shaped cross section including an open side which faces laterally outward of the respective side rail. The open side of the lower slot is offset laterally outward from the open side of the upper slot. In addition, the lower edge of each side rail is provided with an outwardly projecting lip or ridge.

Slide blocks can be mounted in the upper slots of the side rail and various lightweight components of the conveyor, such as guide rails, arches, sensors, and the like, can be connected to the slide blocks. Similarly, slide blocks can be mounted in the lower slot and other heavier components can be connected to those slide blocks. Further, clamping blocks can be connected to the lips on the side rails and serve to connect the side rails to a supporting structure or frame.

The conveyor includes a pair of end units, each of which has a belt supporting spindle which is journaled between a pair of side plates. The side plates are disposed laterally outward of the respective side rails and slide bars are mounted in the slots of the side rails and the side plates are connected to the slide bars.

As a feature of the invention, a belt tensioning mechanism can be associated with an end unit to move the end unit longitudinally of the conveyor to vary the tension on the belt. In addition, a belt tracking mechanism can also be associated with one or both end units to skew the end unit relative to the conveyor to provide proper tracking of the belt on the spindles.

In one embodiment of the invention, a power operated drive unit is carried by one of the end units and is operably connected to the belt supporting spindle of that end unit. In a second embodiment of the invention, the drive unit is located centrally of the conveyor and is carried from slide blocks that are mounted for sliding movement in the lower slots of the side rails.

The side rail construction of the conveyor provides distinct advantages for heavy duty applications. The pair of slots in the side rails permits the attachment of a wide variety of different components to the side rails and enables the components to be shifted longitudinally of the conveyor without interference. As the lower slot is offset outwardly from the upper slot, components attached through one slot will not interfere with components attached through the other slot.

The construction enables a large number of identical parts to be used for various sized conveyors and this substantially reduces the inventory of parts.

As a further advantage, the conveyor can be readily altered to different configurations. For example, different drive units can be connected to the conveyor without altering or modifying the basic conveyor construction, and similarly, various auxiliary components can be connected to the conveyor without any required alteration of the conveyor itself.

The side rails of the conveyor are preferably formed of aluminum extrusions, and due to a multi-chamber construction have high strength and rigidity.

On conveyors of shorter length, a rack and pinion belt tensioning mechanism can be employed to vary the tension on the conveying belt, while with longer length conveyors, a tensioning mechanism is associated with the drive unit and incorporates a fluid actuated tensioning member or spring tensioning.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figures 1, 5:
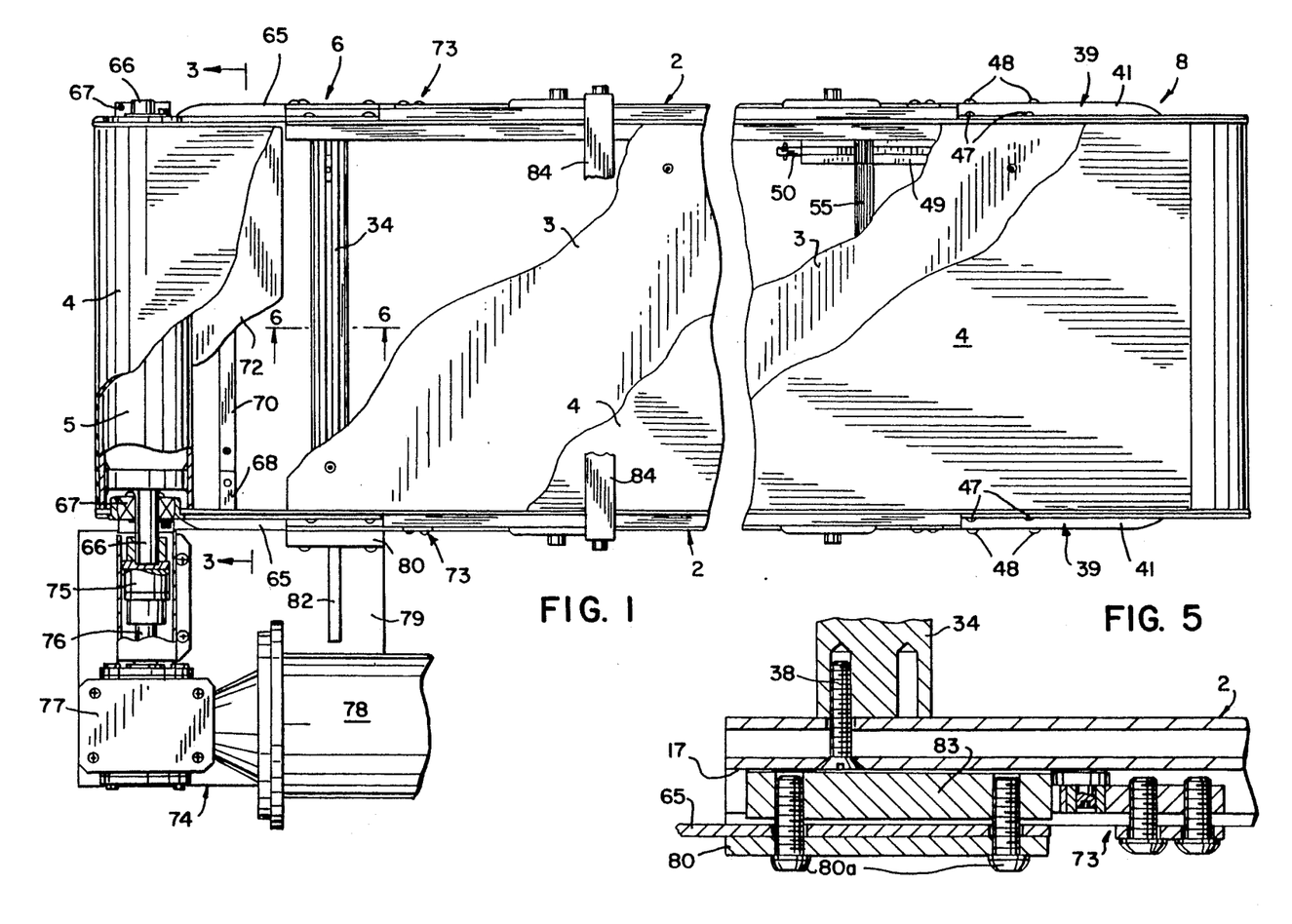
FIG. 1 is a top plan view of the conveyor of the invention with parts broken away in section.
FIG. 5 is an enlarged fragmentary longitudinal section taken along line 5—5 of FIG. 2.
Figures 2, 3, 4:
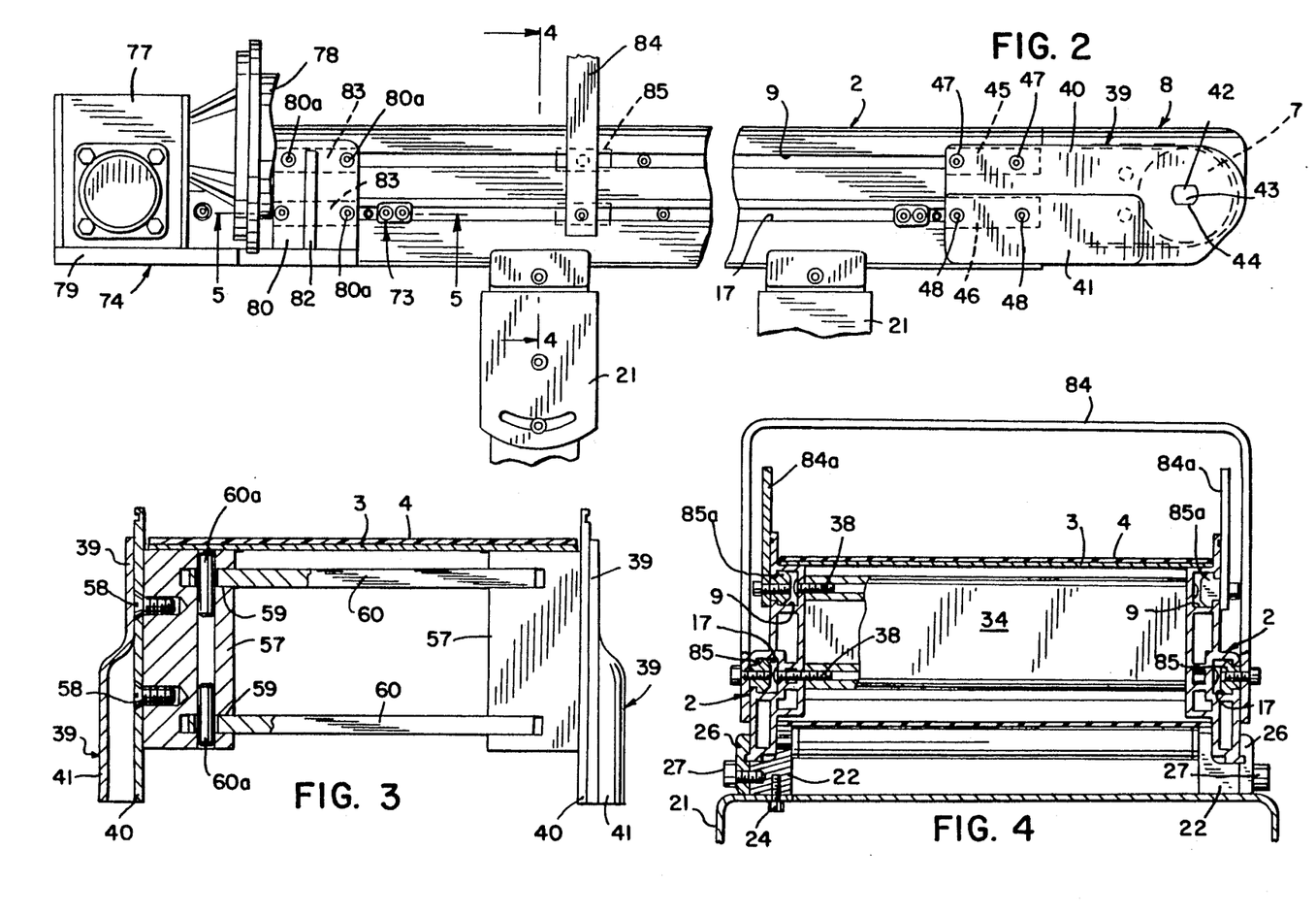
FIG. 2 is a side elevation of the conveyor.
FIG. 3 is a section taken along line 3—3 of FIG. 1.
FIG. 4 is a section taken along line 4—4 of FIG. 2.

FIGS. 1 and 2 illustrate a conveyor 1 having a pair of spaced parallel side rails 2 that support a bed plate 3. An endless conveyor belt 4 rides on bed plate 3 and is driven by a drive spindle or pulley 5 carried by end unit 6. The belt also passes around an idler spindle 7 carried by end unit 8 which is located opposite end unit 6.

Figures 6, 7, 11, 12:
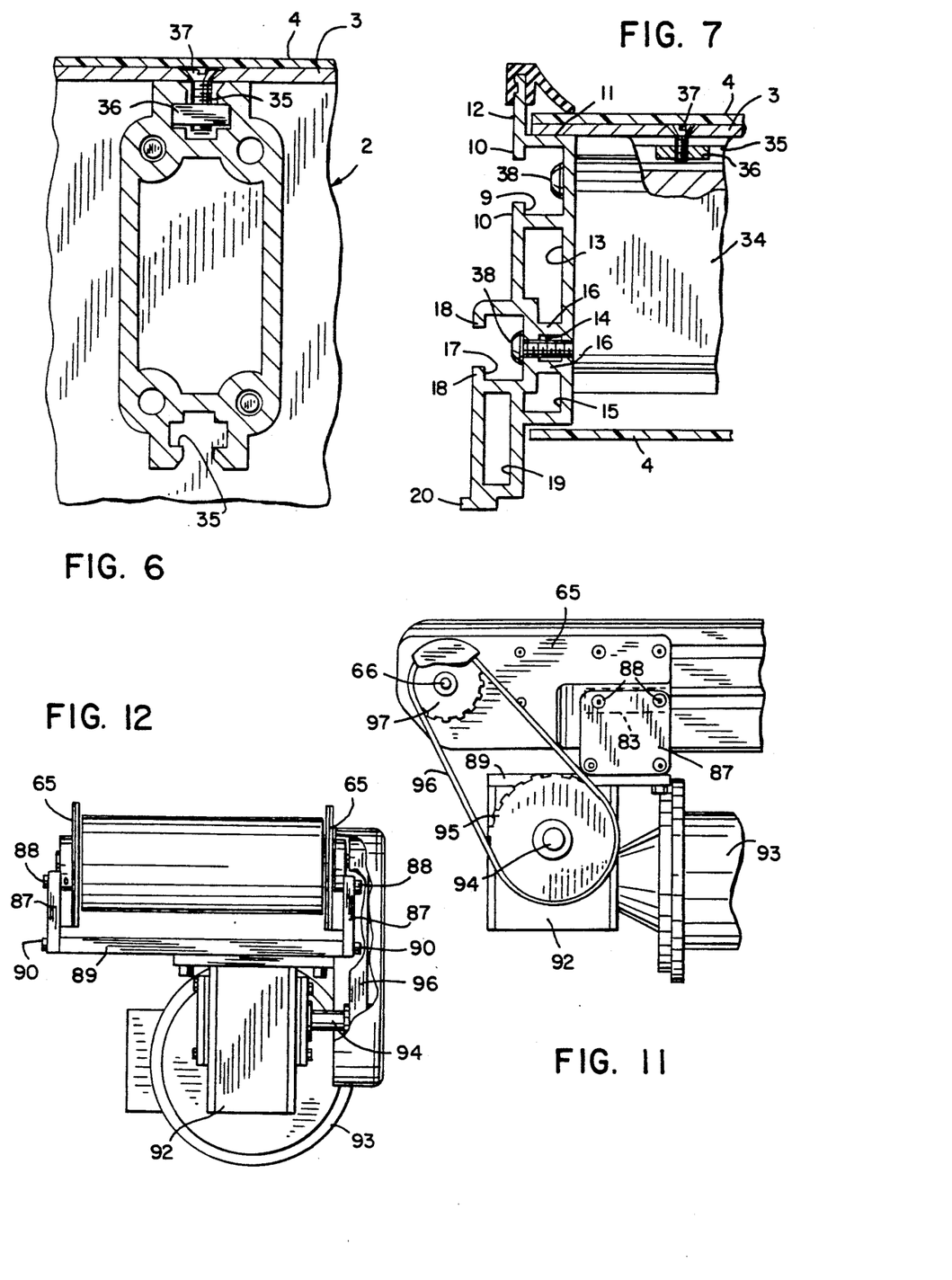
FIG. 6 is a section taken along line 6—6 of FIG. 1 and showing a cross member.
FIG. 7 is an enlarged fragmentary transverse section of the conveyor and showing a side rail.
FIG. 11 is a fragmentary side elevation of a modified form of the invention incorporating a bottom drive unit.
FIG. 12 is an end view of the structure of FIG. 11.

The construction of the side rails 2, is best illustrated in FIG. 7. Each side rail includes an upper slot 9 which is generally T-shaped in cross section and extends the length of the side rail. The open outer end of each slot 9 is bordered by a pair of spaced lips 10. The sides edges of the bed plate 3 rest on the upper surface 11 of each side rail and a flange 12 extends upwardly from the surface 11 and borders the side edge of the bed plate 3 and conveyor belt 4.

Located beneath slot 9 are a series of chambers or passages 13, 14, and 15 which extend the full length of the side rail. Chambers 13-15 serve to stiffen the side rail and the horizontal ribs 16 which border chamber 14 are important in effectively punching holes in the vertical walls that border chamber 14 for bolts that are used for the attachment of cross members which will be hereinafter described.

Each side rail 2 is also provided with a lower slot 17, also having a generally T-shaped cross section, and slot 17 also extends the full length of the side rail and is bordered by a pair of spaced lips 18.

Located beneath lower slot 17 is a longitudinal chamber 19 and the lower end of the side rail is provided with an outwardly extending lip or ridge 20.

Figures 9, 17, 18, 19:
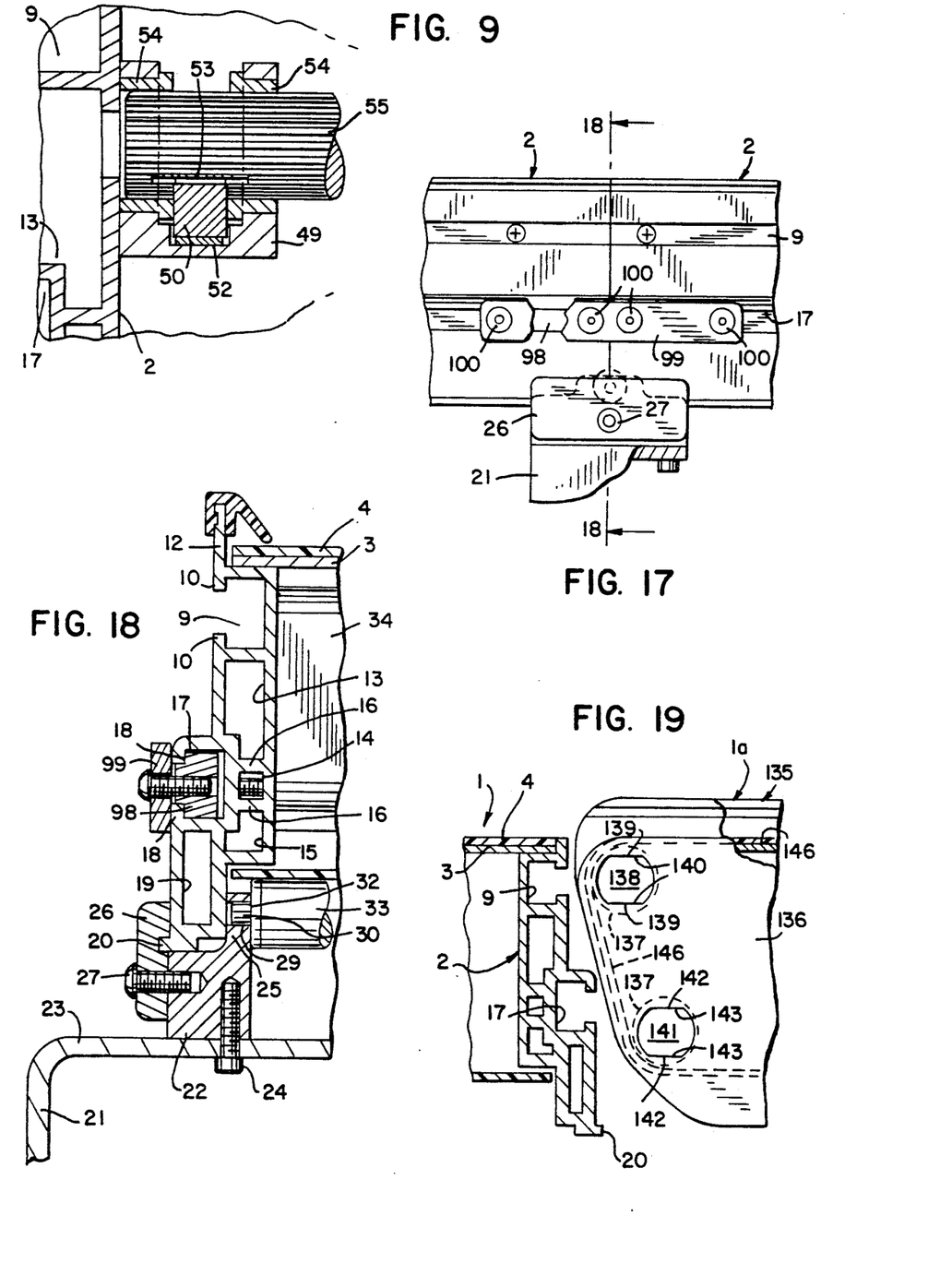
FIG. 9 is a section taken along line 9—9 of FIG. 8.
FIG. 17 is a fragmentary longitudinal section showing the attachment of two conveyor sections.
FIG. 18 is a section taken along line 18—18 of FIG. 17.
FIG. 19 is a fragmentary side elevation of a further modified form of the invention incorporating a pair of conveyors disposed normal to each other.

Side rails 2 are supported from a frame or supporting structure, and as shown in the drawings, the supporting structure comprises a series of inverted U-shaped stands 21. To connect each side rail 2 to the stand 21, a block 22 is secured to the upper horizontal web 23 of stand 21 by bolts 24. Each block 22 is formed with an upstanding flange 25 which is located inwardly of the lower chamber 19 in the side rail, as seen in FIG. 18. A clamping plate 26 is clamped to each block 22 via bolts 27 and each clamping plate is provided with a horizontal groove which receives the lip 20 on the respective side rail 2. Depending on the length of the conveyor, blocks 22 may also be employed to support rollers that support the lower run of the conveyor belt 4. In this regard, the flange 25 of each block 22 is provided with a hole 29 which has a generally figure-8 shape. The ends of a fixed shaft 30 are secured within the lower ends of holes 29 by pins 32, so that the shaft is fixed to the blocks 22, and a roller 33 is mounted for rotation on the shaft 30 and supports the lower run of belt 4, as shown in FIG. 18.

Side rails 2 are connected together by a plurality of spaced cross members 34. As best shown in FIG. 6, the upper and lower ends of each cross member are formed with generally T-shaped slots 35. Nuts 36 are mounted for sliding movement within upper slots 35 and countersunk bolts 37 extend through holes in the bed plate 3 and are received in nuts 36 to tie the bed plate to the cross members 34. The lower T-slots 35 can be employed, if desired, in a similar manner to attach other auxiliary components to the lower ends of the cross members.

Figures 14, 15, 16:
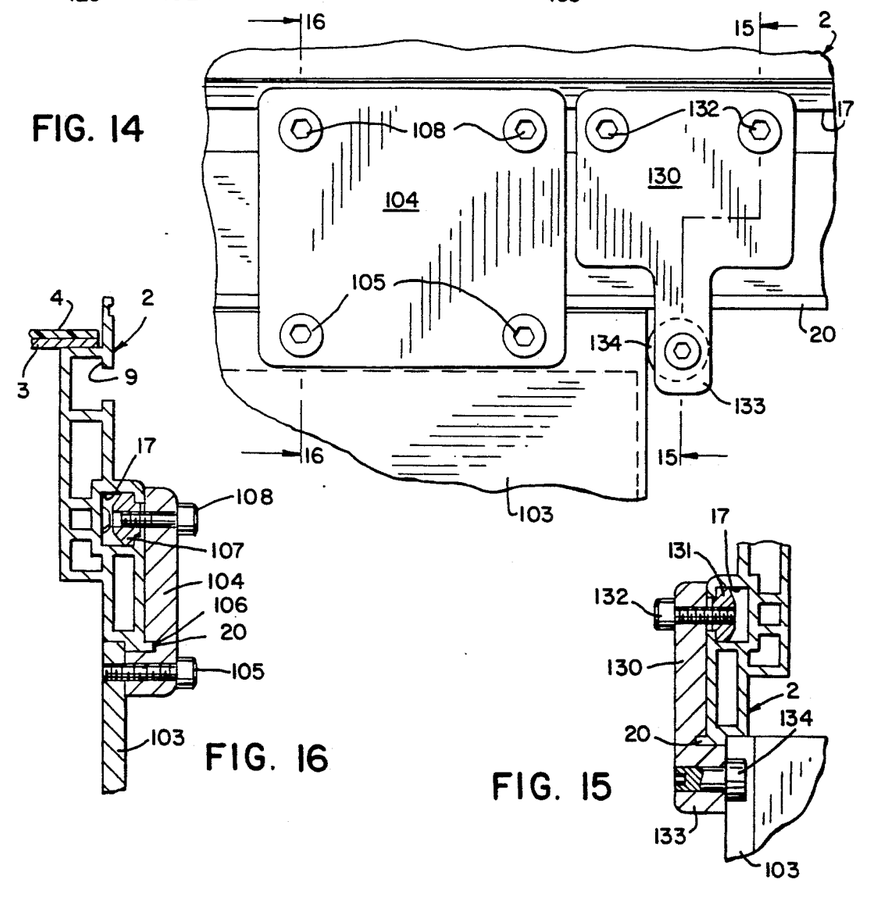
FIG. 14 is an enlarged fragmentary side elevation showing the mechanism for adjusting the position of the drive unit of FIG. 13.
FIG. 15 is a section taken along line 15—15 of FIG. 14.
FIG. 16 is a section taken along line 16—16 of FIG. 14.

The ends of the cross members 34 are provided with four holes and a pair of screws 38 extend through the respective side rails 2, and are threaded in opposed holes to secure the cross member to the side rails. One of the screws 38 extends through a hole formed in the inner wall of the upper T-slot 9, while the other of the screws 38 extends through a hole of the inner wall of the lower T-slot 17, as illustrated in FIG. 7. The heads of the bolts 38 can be countersunk, so that they are flush with the outer surface of the inner wall bordering the slots 9 and 17, so that slide bars or blocks can move freely along the length of the slots. Alternately, button head screws 38 can be utilized in which narrow slide blocks can be inserted in the slots, as shown in FIG. 16, and the button heads will not interfere with movement of the slide blocks in the slots.

Figure 8:
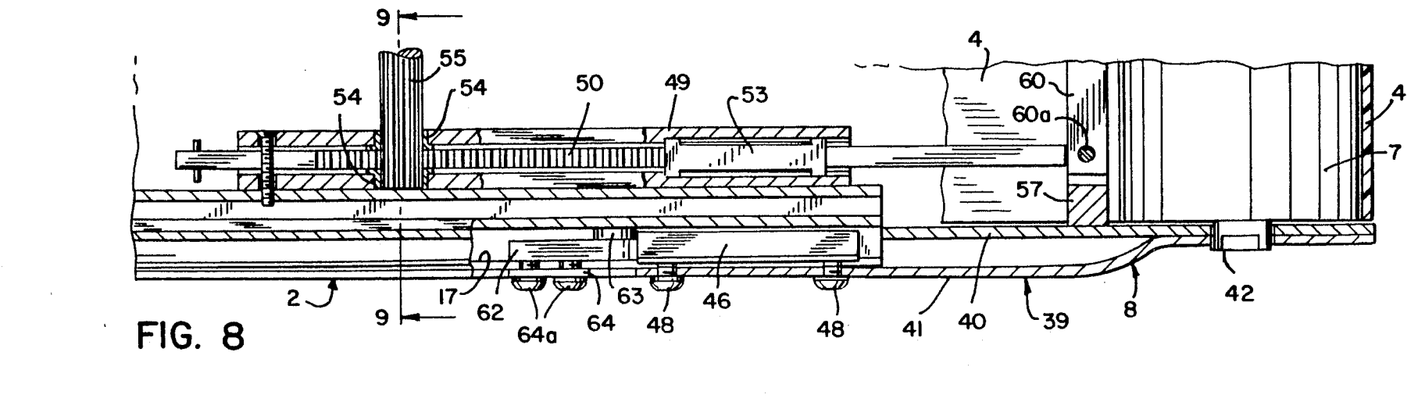
FIG. 8 is a fragmentary longitudinal section showing the rack and pinion belt tensioning mechanism.
Figure 10:
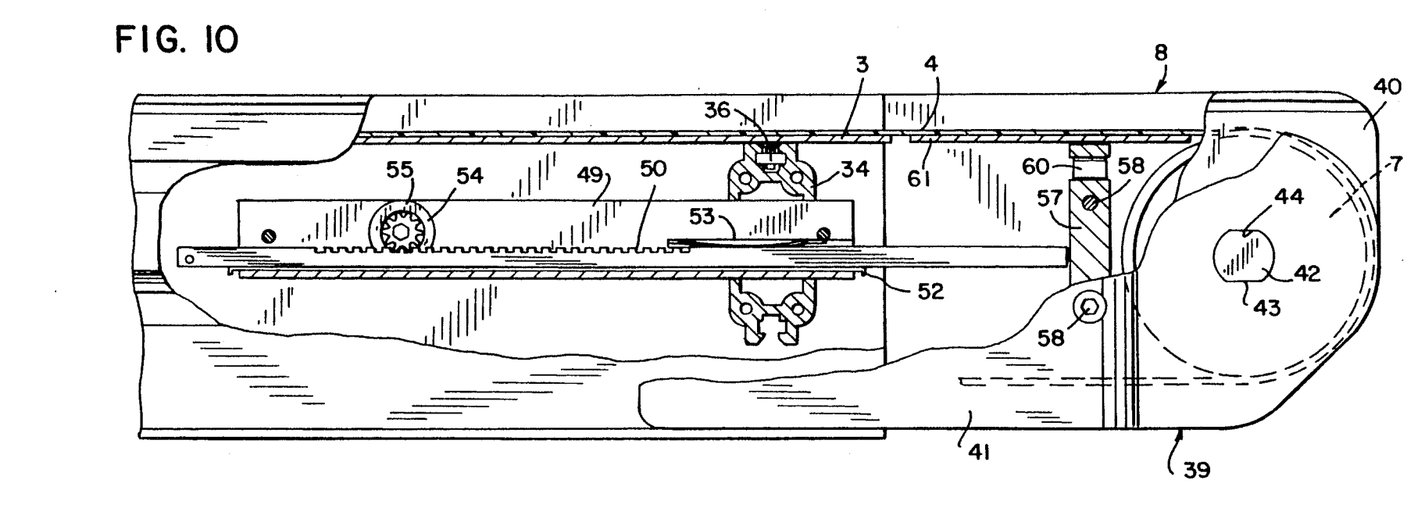
FIG. 10 is a side elevation of the structure of FIG. 8 with parts broken away in section.

The end unit 8 is mounted for sliding longitudinal movement relative to the side rails 2. The end unit 8 includes a pair of spaced side members 39, each formed of a pair of laminated plates 40 and 41, and a shaft 42, which carries the idler spindle or pulley 7, extends through aligned openings in the plates 40 and 41. As shown in FIGS. 8 and 10, the ends of shaft 42 are provided with a pair of opposed flats 43 which mate with flat edges 44 bordering the aligned openings in plate 41. With this construction, shaft 42 is mounted in fixed relation to side members 39 and the idler pulley or spindle 7 is journaled on shaft 42 by internal bearings, not shown.

Side members 39 of end unit 8 are mounted for sliding movement relative to side rails 2 by guide bars 45 and 46. Upper guide bars 45 are mounted within the upper slots 9 in the side rails, while the lower guide bars 46 are disposed in the lower slots 17. Bolts 47 and 48 extend through openings in the side plates 39 and are threaded in the guide bars 45,46, respectively. By threading down the bolts 47,48, the guide bars will be drawn outwardly against the lips 10,18 bordering the respective slots 9 and 17 to secure the side members 39 to the side rails 2.

The end unit 8 includes a rack and pinion mechanism for varying the tension on belt 4, as illustrated in FIGS. 8-10. In this connection, an elongated block 49 having a generally U-shaped cross section is secured to the inner surface of each side rail 2, as seen in FIG. 9, and a rack 50 is mounted for sliding movement within each block 49. A wear strip 52 is positioned in the lower end of the groove in block 49 to support the rack in movement and a leaf spring 53, having its side edges mounted in opposed grooves in block 49 is engaged with the upper surface of the rack to urge the rack downwardly.

The side portions of each block 49 bordering the central recess are formed with aligned openings which receive bushings 54 and a pinion 55 is mounted for rotation within bushings 54 and the teeth of the pinion are engaged with the teeth of the two racks 50. One or both ends of the pinion 55 is provided with a hex-shaped opening which is exposed through the side rail 2 and through use of a hex tool the pinion 55 can be rotated to thereby move both racks 50 in unison in a direction longitudinal of the conveyor. The ends of racks 50 are engaged with blocks 57 attached to side plates 39, so that as the racks are moved outwardly through operation of pinion 55, the end unit 8 will correspondingly be moved outwardly of the side rails 2 to increase the tension on belt 4.

As shown in FIG. 3, each block 57 is attached to the respective side members 39 by a pair of bolts 58 and the inner edge of each block 57 is provided with a pair of vertically spaced slots 59. The ends of generally rectangular links 60 are pivotally mounted within the respective slots 59 by pins 60a. Thus, the links 60 provide an articulated linkage between the side plates 39, which is important in tracking the belt 4, as will be hereinafter described.

The end unit 8 also includes a bed plate extension 61 which is secured to the upper edges of blocks 57 by suitable countersunk bolts. Bed plate extension 61 extends from the end of bed plate 3 to a location adjacent the idler spindle 7, as seen in FIG. 10, and serves to support the belt 4 in this area.

The end unit 8 also includes a mechanism for tracking the belt and the tracking mechanism can be similar to that described in co-pending U.S. patent application Ser. No. 07/637,536, filed Jan. 4, 1991. As shown in FIG. 8, the tracking mechanism includes an elongated block 62, which is mounted within each of the lower slots 17 in side rails 2. A cam or eccentric 63 is mounted for rotation on one end of block 62 and the outer eccentric surface of cam 63 is engaged with the inner end of the respective block 46. The hub of cam 63 is provided with an outer hex-shaped hole to receive a tool, so that the cam can be rotated relative to block 62.

Block 62 is retained within the slot 17 by a retaining plate 64, which is located on the outside of the respective side rail and is connected to block 62 via bolts 64a.

As described in the aforementioned patent application, the belt can be properly tracked by loosening bolts 47 and 48, so that the side members 39 and attached blocks 45 and 46 can slide relative to side rails 2. Block 62 is then moved within the slot 17 to bring the surface of cam 63 into engagement with the end of the respective block 46, and the block 62 is then secured to the side rails by tightening down of bolts 64a. Through rotation of one of the cams 63, the corresponding block 46 and the attached side member 39 can be moved relative to the other side plate to properly adjust the tracking. The articulated links 60 permit this relative movement between side members 39.

As shown in the drawings, end unit 6 includes a direct drive mechanism which drives the drive spindle 5 to move belt 4 in its endless path of travel. End unit 6 includes a pair of side members 65, each formed of a pair of laminated side plates similar to side members 39 of end unit 8, and a shaft 66 that is secured to the inner surface of spindle 5 projects outwardly of each end of the spindle. The projecting ends of shaft 66 are journaled within bearings 67 attached to side members 65.

An articulated linkage connects the side members 65 and is similar to that described with respect to end unit 8. More specifically, blocks 68, similar to blocks 57 are secured to the inner surface of each side member 65 by bolts 69 and a pair of links 70, similar in construction to links 60, are pivotally connected between the blocks 68. A bed plate extension 72 is secured to the upper edges of blocks 68 by suitable bolts.

In addition, the end unit 6 includes a cam operated tracking mechanism, indicated generally by 73, which is similar to the cam tracking mechanism previously described with respect to end unit 8. However, end unit 6 does not include a rack and pinion tensioning mechanism, as utilized with the end unit 8.

The drive unit for driving the drive spindle 5 is indicated generally by 74 and is carried in an outboard manner from the end unit 6. More specifically, the drive unit 74 includes a flexible coupling 75, which couples the projecting end of shaft 66 with the output shaft 76 of gear box 77. Gear box 77 is driven by a motor 78. As shown in FIGS. 1 and 2, gear box 77 and motor 78 are mounted on a horizontal plate 79 and the plate is connected to the lower edge of a block 80. In addition, a web 82 connects the plate and block 80. Each block 80 is connected by bolts 80a to slide blocks 83 that are mounted in the slots 9 and 17 of the respective side rail 2. With the construction shown in FIGS. 1 and 2, a direct drive is provided, with the drive unit being located outboard of the conveyor and being supported from the end unit 6.

As previously described, the lower slots 17 in side rails 2 are used to attach the conveyor to a supporting structure or framework, or to mount a drive unit to the conveyor. On the other hand, the upper slots 9 are used primarily to attach auxiliary components or equipment, such as guides, stops, or sensors, to the conveyor. As the slots 9 are inwardly offset from the slots 17, the connectors and components which are connected to the side rails through slots 9 will not interfere with the connectors and components that are connected to the side rails through slots 17.

FIGS. 1, 2 and 4 show a support 84 which is attached to side rails 2 and the support is in the form of an arch which extends transversely over the conveyor. Alternately, the support can extend only along one side of the conveyor and support guide rails, or other equipment, such as photosensors or the like. To connect the legs of arch 84 to the side rail, a block or a spring-loaded T-shaped nut 85 is slidably mounted within each lower slot 17 and bolts extend through holes in the legs of arch 84 and are threaded into openings in blocks 85. Blocks or nuts 85 can slide along the entire length of the slot 9 to thereby position the arch 84 at any desired location along the length of the conveyor. As illustrated in FIG. 4, guides 84a can be connected to slide blocks or T-shaped nuts 85a mounted in the upper slots 9 and due to the offset relation between slots 9 and 17 there will be no interference between arch 84 and guides 84a.

FIGS. 11 and 12 show a modified form of the invention, in which the conveyor belt is driven by a variable speed bottom drive, which is supported from the end unit 6. The drive unit includes a pair of vertical plates 87, the upper edges of which are connected by bolts 88 to slide blocks 83 that are mounted in lower slots 17 of the side rails 2. In this regard, bolts 88 extend through holes in the respective side plates 65 and are threaded to blocks 83. A horizontal plate 89 is connected between the lower ends of vertical plates 87 by bolts 90 and a gear box 92 and motor 93 are suspended from the plate 89. The output shaft 94 of gear box 92 carries a sprocket 95 which is connected via belt 96 to a sprocket 97 on the projecting end of shaft 66 of the drive spindle 5. With this construction operation of the motor will operate through the belt drive to rotate the drive spindle 5 and move belt 4 in its path of travel.

As seen in FIG. 12, the drive unit is located beneath the conveyor and is supported solely from the side plates 65 of the end unit 6. By changing the size of the sprockets 95 and 97, the speed of travel of conveyor belt 4 can correspondingly be changed. While the drawings show the use of a timing belt drive to connect sprockets 95 and 97, it is contemplated that a chain drive can also be utilized.

If the conveyor has a substantial length it can be composed of a number of sections which are connected together in end-to-end relation. To provide the connection between conveyor sections, an elongated slide block 98 is positioned within the abutting slots 17 of two conveyor sections and bridges the joint, as shown in FIGS. 17 and 18. An elongated retaining plate 99 is mounted on the outer surface of the abutting side rails 2 and is connected to the slide block by a series of bolts 100. With this connection, the two conveyor sections can be connected together in end-to-end relation.

Figure 13:
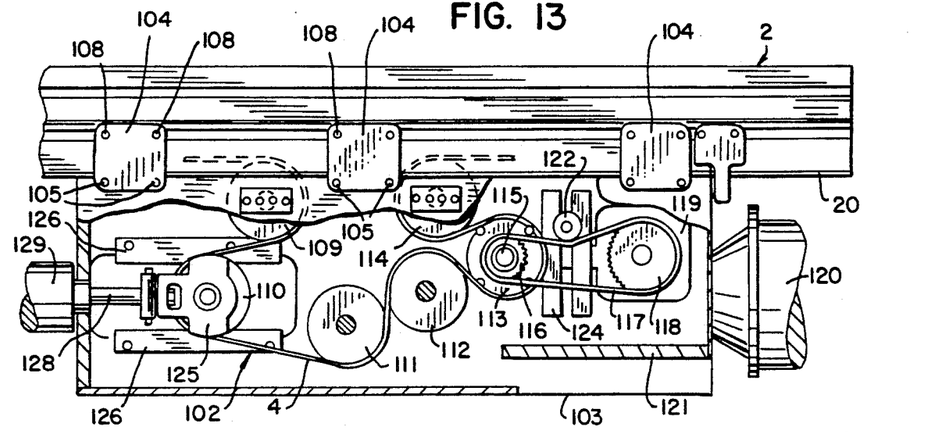
FIG. 13 is a fragmentary side elevation of a further modified form of the invention incorporating a central drive unit.

FIGS. 13-16, illustrate a modified form of the invention, using a central drive unit 102 having a pneumatic belt tensioning mechanism. As shown in FIG. 13, the drive unit 102 is suspended from the central portion of conveyor 1 and includes a pair of vertical spaced side members 103. The upper end of each side member 103 is connected to the lower ends of a series of connecting blocks 104 by bolts 105. The inner surface of block 104 has a longitudinal groove 106, which receives the lip 20 on the lower edge of the side rail 2, as seen in FIG. 16.

A group of slide blocks 107 are mounted within the lower slot 17 of the side rail and the upper edge of each block 104 is connected to block 107 by a pair of bolts 108. With this connection the drive unit 103 is suspended from the side rails 2 and due to the connection of the blocks 104 and 107 to the side rails, the drive unit can be moved longitudinally along the length of the conveyor to any desired position.

As shown in FIG. 13, the lower run of belt 4 passes around an idler roller 109 which is journalled between side members 103 and then passes around a tensioning roller 110. The belt 4 then travels over a pair of idler rollers 111 and 112 which are journaled between side plates 103 and is then trained over a drive roller 113. After passing over drive roller 113, the belt then travels over an idler roller 114, which is also journalled between side members 103.

Drive roller 113 carries a shaft 115 and one end of the shaft carries a sprocket 116 which is connected through a timing belt 117 to a sprocket 118 on the output shaft of the gear box 119. Gear box 119, in turn, is driven by a motor 120. A horizontal plate 121 extends between side members 103.

The timing belt 117 can be tensioned by means of a tensioning roller 122, which is carried by a slide block that is slidable in the vertically spaced guides 124. The tensioning is a conventional type and by moving the slide block within guides 124, the tension on the timing belt can be adjusted.

The drive unit 102 includes a pneumatic tensioning mechanism for conveyor belt 4 which is particularly useful when the conveyor has a substantial length. The rack and pinion tensioning mechanism previously described is useful primarily with conveyors of relatively short length. If the conveyor has a substantial length the adjustment provided by the rack and pinion may not be adequate. Accordingly, a pneumatic tensioning system is incorporated with the drive unit 102.

The belt tensioning roller 110 is mounted on a slide block 125 which is slidable within a pair of spaced horizontal guideways 126, which are mounted on plate 103. The outer end of piston rod 128 is connected to slide 125 and the piston rod is connected to a piston which is slidable within a pneumatic cylinder 129 Extension and contraction of the piston rod 128 will act to tension the conveyor belt 4.

In situations where the conveyor 1 has a substantial width, a provision is made to adjust or skew the drive unit 102 to provide proper tracking of belt 4 as it passes over the rollers in the drive unit. The tracking mechanism, as best shown in FIGS. 14 and 15, includes a pair of brackets 130, each of which is connected to a slide block 131 that is mounted for sliding movement in the lower slot 17 of the respective side rail 2. Bolts 132 connect the upper edge of bracket 130 to the slide block 131.

The lower end of each bracket 130 is provided with a downwardly extending leg 133, and a cam or eccentric 134 is mounted for rotation on the lower end of leg 33. The peripheral surface of cam 134 is disposed in engagement with the end of the respective side plate 103.

To adjust the tracking, brackets 130 are positioned such that the cam surface of cam 134 is engaged with the end of the respective side plate 103 and the brackets 130 are then locked in position by turning down the bolts 132. Bolts 108 are then loosened to permit the slide blocks 107 along with blocks 104 and the attached side plates 103 to move relative to side rails 2. One of the cams 134 is then rotated by use of a tool which is inserted in the hex-shaped hole of the cam shaft, causing the respective side plate 103 to move. While the side members 103 are tied together, there is enough tolerance between the slide blocks 104 and the slots 17 to permit skewing of the drive unit as one of the cams 134 is rotated. With the belt properly tracked, the bolts 108 can then be tightened to secure the side members 103 to the side rails 2.

The drive unit 102 can be moved anywhere along the length of the conveyor, so that the drive can be positioned to avoid any obstructions that may be located beneath the conveyor. In addition, the drive unit includes a pneumatic tensioning mechanism for tensioning the belt and a tracking mechanism for providing proper tracking of the belt as it travels over the rollers of the drive unit.

FIG. 19 illustrates a further embodiment of the invention, in which two conveyors 1 and 1a are located normal or at 90° with respect to each other, to permit articles to be transferred from conveyor 1a to conveyor 1. As shown in FIG. 19, the end unit 135 of the second conveyor is disposed at 90° with respect to the conveyor 1. End unit 135 includes a pair of side members 136, similar to side members 39, each formed of a pair of laminated plates, and the side members 136 are connected by an articulated linkage, similar to linkage 60.

Because of the offset relationship of slots 9 and 17 in conveyor 1, the end unit 135 of conveyor 1a includes a pair of small diameter pulleys or spindles 137 over which the belt 4 is trained. The ends of shaft 138 of the upper spindle 137 are is provided with flats 139 which mate with flat surfaces 140 bordering the aligned openings in the laminated plates of side members 136. Similarly, the ends of the shaft 141 of the lower spindle 137 are provided with flats 142 which mate with the flat surfaces 143 bordering the lower opening in the respective side member 136.

As the lower spindle is offset inwardly from upper spindle, the belt 146 of the conveyor 1a can be disposed in proximate relation with the side edge of the belt 4 of conveyor 1 to minimize the gap between the conveyor belts. The path of travel of the belt in passing from upper spindle to the lower spindle proximates the contour of the outer surface of side rail 2.

With the conveyor construction of the invention utilizing the pair of offset slots 9 and 17 in the side rails, as well as the lip 20, various components can be attached along the length of the conveyor. More particularly, smaller components, such as arches, guides, sensors, and the like, can be attached to the side rails 2 through the upper slots 9, while heavier components, such as drive units, can be attached to the side rails through the lower slots 17, and the connections through the lower slots will not interfere with the connections made through the upper slots 9.

The conveyor construction of the invention permits changing from one drive module to another without the necessity of altering any components of the conveyor itself. In this regard, the outboard drive, as shown in FIG. 1, the variable speed lower drive unit such as shown in FIG. 11, or the central drive unit 102, as shown in FIG. 13, can be connected to the conveyor without any alteration of the basic conveyor itself. Further, either a rack and pinion belt tensioning mechanism, or a pneumatic tensioning mechanism can be employed with the conveyor.

Various modes of carrying out the invention are contemplated as being within the scope of the following claims particularly pointing out and distinctly claiming the subject matter which is regarded as the invention.

We claim:

1. In a conveyor, a pair of spaced parallel side rails, a conveying member supported by said side rails, at least one of said side rails having a pair of vertically spaced parallel longitudinal slots, each slot having an open side facing laterally outward of the side rail, the open side of one slot being offset laterally from the open side of the other slot, a slide block disposed in at least one of the slots, a support member disposed laterally of the side rail, and connecting means connecting the support member to the slide block.

2. The conveyor of claim 1, wherein the slots in the side rail comprise an upper slot and a lower slot, the open side of the lower slot in each rail being offset laterally outward from the open side of the upper slot of that rail.

3. The conveyor of claim 2, wherein each slot has a generally T-shaped cross sectional configuration and the open side of each slot is bordered by a pair of vertical spaced lips.

4. The conveyor of claim 2, and including a plurality of transverse cross members disposed between said side rails, first fastening means disposed in each upper slot for attaching the corresponding side rail to an end of a cross member, and second fastening means disposed in each lower slot for attaching the corresponding side rail to an end of a cross member.

5. The conveyor of claim 2, wherein each side rail includes at least one longitudinally extending chamber disposed beneath said upper slot and disposed laterally inward of said lower slot.

6. The conveyor of claim 5, and including a second chamber extending longitudinally of each side rail and disposed beneath the lower slot.

7. The conveyor of claim 2, wherein each side rail is an aluminum extrusion.

8. The conveyor of claim 1, and including an outwardly projecting lip disposed on the lower edge of each side rail.

9. The conveyor of claim 2, and including a generally flat upper surface on each side rail to support said conveying member, said upper surface bordering said upper slot.

10. The conveyor of claim 9, and including an upstanding flange disposed on the upper edge of each side rail, said upper flanges bordering the respective side edges of the conveying member.

11. The conveyor of claim 5, wherein said one chamber is bordered by an inner wall and an outer wall, said outer wall separating said one chamber from said lower slot.

12. The conveyor of claim 11, and including a plurality of transverse members disposed between the side rails, said conveyor also including a fastener extending through aligned openings in said inner and outer walls and connected to the respective end of a transverse member.

13. The conveyor of claim 12, and including a bed plate supported on said transverse members, said conveying member riding on said bed plate.

14. The conveyor of claim 2, wherein said slide block is disposed in an upper slot and said support member extends upwardly above the level of said conveyor belt.

15. The conveyor of claim 1, and including a drive unit carried by said support member, said conveying member being an endless belt and said conveyor also including a driven belt supporting member, said drive unit being operably connected to said belt supporting member unit being operably connected to said belt supporting member.

16. The conveyor of claim 15, wherein said drive unit is disposed at the end of said conveyor.

17. The conveyor of claim 15, wherein said drive unit is disposed intermediate the ends of said conveyor.

18. The conveyor of claim 15, wherein a support member is associated with each side rail and each support member comprises a side plate, said belt supporting member being journaled for rotation in said side plates.

19. The conveyor of claim 18, wherein said drive unit is disposed outboard of said conveyor and is connected to said belt supporting member.

20. The conveyor of claim 15, and including belt tensioning means associated with said drive unit for adjusting the tension on said belt.

21. The conveyor of claim 20, and including fluid actuating means operably connected to said belt tensioning means for operating said belt tensioning means.

22. The conveyor claim 1, and including a second conveyor having an end disposed normal to one of the side rails of said first conveyor, a second conveying member mounted for travel on said second conveyor, a pair of rotatable spindles mounted for rotation on said end of the second conveyor and disposed to support said second conveying member in travel, said spindles being at different vertical levels and being offset horizontally.

23. The conveyor of claim 22, wherein the slots in said one side rail comprise an upper slot and a lower slot, the open side of the lower slot in said one rail being offset laterally outward from the open side of the upper slot of that rail, said spindles including an upper spindle and a lower spindle, said upper spindle being offset outwardly in a longitudinal direction of the second conveyor from said lower spindle.

24. the conveyor of claim 23, wherein said upper spindle is located adjacent said upper slot and said lower spindle is located adjacent said lower slot.

25. The conveyor of claim 1, wherein each side rail has at least one longitudinally extending internal chamber.

26. A conveyor construction, comprising a frame including a pair of spaced parallel side rails, belt supporting means carried by said side rails, a conveyor belt supported by said belt supporting means for travel in an upper conveying run and a lower run, each side rail having a longitudinally extending slot, a slide block slidably mounted in each of the slots, a connecting member disposed laterally outward of each side rail, attaching means for attaching each connecting ember to the corresponding slide block, a drive unit carried by the connecting members and disposed beneath said frame, said drive unit including a pair of side members and having a rotatable belt driving member engaged with the lower run of said belt and journaled with respect to said side members, said drive unit also including power means operably connected to said belt driving member to thereby drive said belt, and belt tracking means mounted in the slot of one of said side rails and engaged with one of said side members for individually moving said one side member relative to the other side member to adjust the tracking of the belt.

27. The conveyor of claim 26, wherein said belt tracking means comprises cam means mounted for rotation relative to said side rail, said cam means having a cam surface engaged with an abutment on said one side member of the drive unit.

28. The conveyor of claim 27, wherein said cam means is mounted for rotation on a second slide block, said second slide block being mounted for sliding movement relative to one of said side rails, and securing means for securing said second side block to said side rail.

29. In a conveyor, a pair of spaced parallel side rails, a belt supporting ember carried by said side rails, a conveyor belt supported by said belt supporting member, each side rail having a longitudinally extending slot, each slot having a generally T-shaped cross section and each slot having an open side facing laterally outward of the respective side rail, a slide block slidably mounted in each slot, a connecting member disposed laterally outward of each side rail and removably connected to the respective slide block, the lower edge of each side rail having a longitudinal outwardly extending rib disposed parallel to said slot, said connecting member having a longitudinal groove to receive said rib, and attaching means for attaching the lower end of said connecting member to an object.

30. The conveyor of claim 29, wherein said object has an upper surface and each side rail has a shoulder to engage said upper surface.

31. A conveyor construction, comprising a pair of spaced side rails, a spindle assembly including a pair of spaced parallel side members and a rotatable spindle disposed transversely of said side rails and journaled with respect to said side members, an endless conveyor belt mounted for movement on said spindle, each side rail having a longitudinal slot, each side member being mounted for sliding movement in a slot of one of said side rails, said spindle assembly also including a pair of parallel spaced links extending transversely between the side members of the spindle assembly, pivot means for pivoting the corresponding ends of said links to the respective side members of the spindle assembly about pivot axes normal to the path of travel of said belt, the pivotal attachment of the ends of said link to said side members enabling each side member to move individually relative to the side rails, and belt tracking means for individually moving at least one side member of said spindle assembly relative to the other side member to thereby adjust tracking of the belt.

* * * * *

UNITED STATES PATENT AND TRADEMARK OFFICE
CERTIFICATE OF CORRECTION

PATENT NO. : 5,156,260

DATED : October 20, 1992

INVENTOR(S) : WOLFGANG C. DORNER ET AL

It is certified that error appears in the above-identified patent and that said Letters Patent is hereby corrected as shown below:

Col. 10, Lines 30-31 Delete" unit being operably connected to said belt supporting member"; Col. 11, Line 12, CLAIM 26, Cancel "ember" and substitute therefor --member--; Col. 11, Line 37, CLAIM 29, Cancel "ember" and substitute therefor --member--

Signed and Sealed this

Fourth Day of January, 1994

Attest:

BRUCE LEHMAN

*Attesting Officer*       *Commissioner of Patents and Trademarks*